United States Patent [19]

Forchheimer et al.

[11] Patent Number: 4,684,991

[45] Date of Patent: Aug. 4, 1987

[54] DEVICE FOR AN ARRAY OF PHOTO DIODES ARRANGED IN A MATRIX

[76] Inventors: Robert Forchheimer, Tingsvägen 24A, 582 49 Linköping; Anders Ödmark, Minsjö Säteri, 605 90 Norrköping, both of Sweden

[21] Appl. No.: 676,196

[22] PCT Filed: Mar. 7, 1984

[86] PCT No.: PCT/SE84/00083

§ 371 Date: Oct. 22, 1984

§ 102(e) Date: Oct. 22, 1984

[87] PCT Pub. No.: WO84/03810

PCT Pub. Date: Sep. 27, 1984

[30] Foreign Application Priority Data

Mar. 15, 1983 [SE] Sweden .................................. 8301398

[51] Int. Cl.⁴ .................................................. H04N 3/12
[52] U.S. Cl. ............................. 358/213.11; 358/212; 358/133
[58] Field of Search ............... 358/213, 212, 133, 135, 358/136, 160, 165, 260; 382/68, 34, 48

[56] References Cited

U.S. PATENT DOCUMENTS 4,503,467  3/1985  Ida et al. ............................. 358/212
4,543,660  9/1985  Maeda .................................. 382/34

*Primary Examiner*—L. T. Hix
*Assistant Examiner*—David M. Gray
*Attorney, Agent, or Firm*—Hayes, Davis & Soloway

[57] ABSTRACT

The invention relates to a device for an array (1) of photo diodes arranged in a matrix, which are integrated onto the same semi-conductor substrate (4) as a picture processor (3) connected to the photo diodes. The picture processor (3) is of a type allowing parallel signal processing, such as a picture transformation of the picture signals coming from the photo diodes. The characteristic of the invention is that the device includes a digital circuit (17) of combinatorial or sequential type connected to the processor (3). This is arranged on said substrate and designed to determine the number and/or the position and/or the sum of positions of the picture elements which the photo diodes (1) and the picture processor (3) have established to fulfil a digital criterion.

3 Claims, 3 Drawing Figures

DEVICE FOR AN ARRAY OF PHOTO DIODES ARRANGED IN A MATRIX

The present invention relates to a device for an array of photo diodes arranged in a matrix, which are integrated to the same semi-condutor substrate as a picture processor connected to the photo diodes, where the picture processor is of a type allowing parallel signal processing, such as picture transformation of the picture signals coming from the photo diodes.

Computerized picture processing had already been introduced in the sixties but it is only during recent years that it has become industrially interesting as equipment and algorithms have reached a sufficient level of maturity. This kind of picture processing has so far been realized in discrete systems where a TV camera and a computer have been the basic components.

To reach a more efficient usage of this technique the inventors at the Tenth Nordic Semi-conductor Convention, June 1982, have suggested an integrated solution including a camera in the form of a photo diode matrix as well as a picture processor. Such a picture processor is characterized by a high parallellism and therefore performs rapid operations on pictures.

This kind of system has so far only been inplemented as prototypes. When using these it has become obvious that the efficiency which is desired by the integration is jeopardized because the picture processing result cannot be extracted rapidly and efficiently from the circuit. One of the drawbacks is that a resulting picture must be read out from the circuit as this picture generally is the base for following, numerical calculations. As the number of connections to the circuit is considerably less than the number of picture elements this read out must take place serially which eliminates some of the speed advantage of the fast picture processor.

This invention aims to cure this disadvantage and this is achieved in that the device includes a digital circuit of a combinatorial or sequential type connected to the processor and designed to determine the number and/or the position of the picture elements which the photo diodes and the picture processor have established to fulfil a digital criterion.

The invention reduces the need to read out picture data by providing highly compressed information which can be brought out easily and be used for further processing.

In the following the invention will be explained further referring to the enclosed drawing where:

Figure 1:
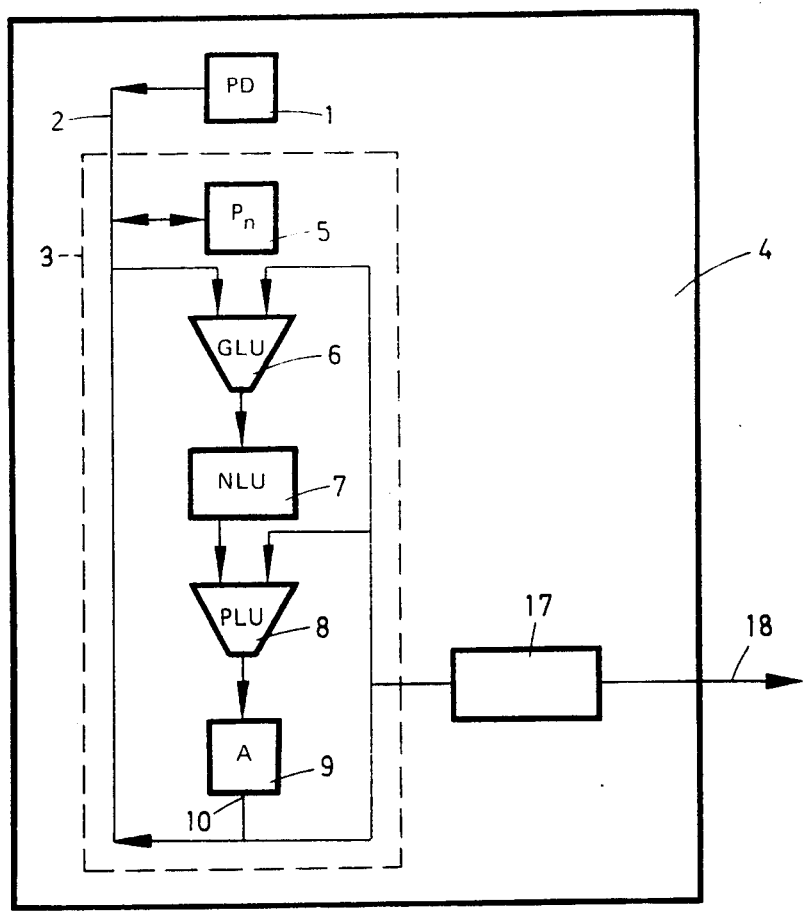
FIG. 1 shows a block chart of a device according to the invention integrated onto a single semi-conductor substrate.

In FIG. 1, 1 represents a diode matrix consisting of a number of photo diodes (PD), which via a data bus 2 is connected to a picture processor 3 with as many channels as the number of photo diodes in the matrix. Although it is not clearly spelt out, it is obvious that all signals are transformed into digital form to be able to be received and processed by the picture processor. The photo diode matrix 1 and the picture processor 3 are arranged on a common semi-conductor substrate using established semi-conductor technology and the picture processor is of the previously said type and capable of performing parallel picture processing operations.

Such a picture processor 3 includes an array of picture registers ($P_n$) 5, a global logical unit (GLU) 6, a neighbourhood logical unit (NLU) 7, a point logical unit (PLU) 8, and an accumulator register (A) 9. The picture registers 5 are communicating via the bus 2 with one of the inputs of the GLU 6 and with the output 10 of the accumulator register 9. Said output is also connected to the other input of the GLU 6 and to one input of the PLU 8. The output of the GLU 6 is connected to the input of the NLU 7 and the output of this unit is connected to the other input of the PLU 8. The output of the PLU 8 is in turn connected to the input of the accumulator register. The GLU 6 is arranged to mark out such objects of a picture delivered from the accumulator register 9, which are pointed to by a picture D coming from the data bus 2, where the picture in turn can originate from either the diode matrix 1 or the picture register array 5. To point to an object means that one states that at least one picture element in the picture A belongs to the object which will be marked out and therefore has a certain binary value. Using picture D to point to an object means that a corresponding picture element is given said binary value.

Figure 3:
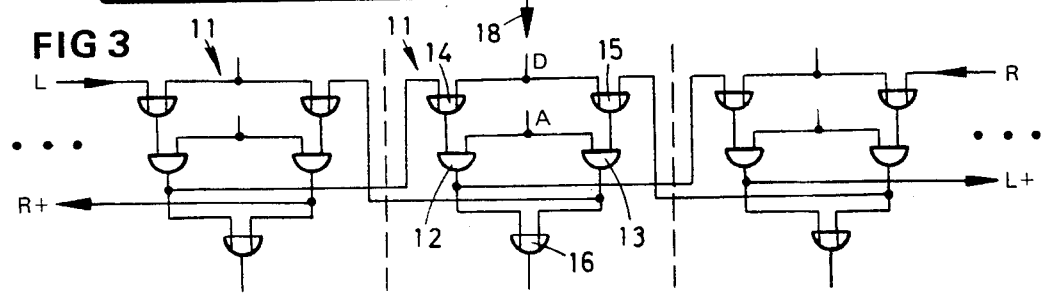
FIG. 3 shows a preferred embodiment of a circuit block included in the invention.

A preferred design of the GLU 6 is shown in FIG. 3. For each photo diode in the diode matrix 1 the GLU 6 includes a circuit block 11 each consisting of two AND-gates 12, 13 and the OR-gates 14, 15 and 16 each having two inputs. One input of the AND-gates 12, 13 is connected to the accumulator register 9, while the other input is connected to the respective output of the OR-gates 14, 15 respectively. The output of the AND-gates 14, 15 are connected to both inputs of the OR-gate 16. One input of the OR-gates 14, 15 is connected to the data bus 2. The other input of the OR-gate 14 is connected to the output of the AND-gate 12 in the neighbouring GLU circuit block on one side while the other input of the OR-gate 15 is connected with the output of the AND-gate 13 in the neighbouring GLU circuit block on the other side.

The circuit block 11 works as follows: if a corresponding picture element belongs to an object, i.e. A=1 there is a possibility that the picture element will be marked out i.e. G=1. The condition for the picture element to be marked out is that at least one of the outputs of the gates 14, 15 is set to "one". This is the case either when the picture point is exactly the one pointed to i.e. D=1, or when the outputs of the gates 12 or 13 of the neighbouring GLU circuit blocks are set to "one" i.e. when the corresponding picture elements have been found to belong to the object.

The effect of this is that the circuit blocks 11 included in the GLU 6 co-operates mutually via the output signals from the gates 12 and 13. The output signal (L) of the gate 12 can be considered as going from circuit block to circuit block in one direction and the output signal of the gate 13 as going from circuit block to circuit block in the other direction.

The NLU 7 is arranged to compare each local area of a picture coming from the GLU 6 with a template. When the picture co-incides with the template this is marked with a logical "one". In all other places the picture gets the logical value "zero". The NLU 7 is therefore used to mark edges or isolated points, but can also be made to shift or invert the picture.

The PLU 8 is arranged to carry out distinct logical operations of the type AND, OR and EXCLUSIVE- OR between two pictures, from the accumulator register 9 and from the NLU 7 respectively. For example the EXCLUSIVE-OR operation is used to mark differences between said pictures.

The picture register array 5 and the accumulator register 9 is used for intermediate storing of pictures.

According to the invention the device includes a digital circuit 17 of a combinatorial or sequential type. The circuit 17 arranged on the substrate 4 is designed to determine the number and/or the position of the picture elements which via the diode matrix 1 and the picture processor 3 has been established to fulful a digital criterion. In FIG. 1 for example the circuit 17 is connected to the output 10 of the accumulator register 9, but it is obvious that the circuit 17 alternatively can be connected to any point in the processor where pictures exist. On the output 18 of the circuit 17 which can be connected to a calculation unit, preferably a computer, a digital number is achieved, which can form the base for calculating a number of characteristics of an object, such as the position, length, perimeter, area and the position of the centre of gravity.

Figure 2:
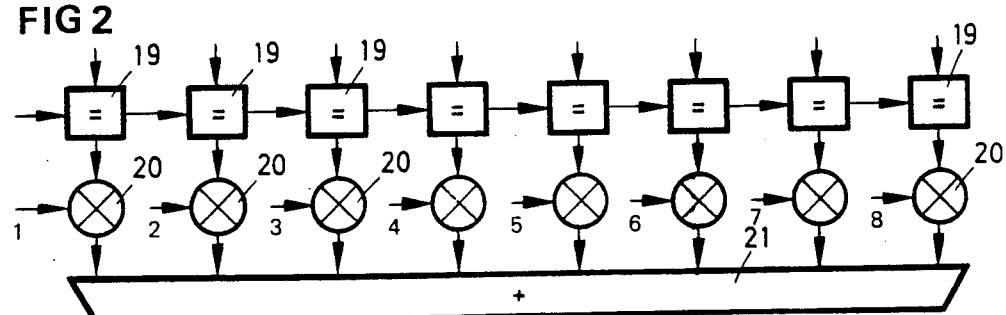
FIG. 2 shows a preferred embodiment of a digital circuit according to a special characteristic of the invention.

The build-up of a preferred design of a digital circuit 17 according to the invention is shown in FIG. 2. The circuit includes a number of comparators 19 which is the same as the number of photo diodes in the matrix 1. In FIG. 2 said number is for example 8.

At each output of the respective comparators a multiplicator 20 with two inputs is connected. The digital circuit 17 also includes a digital adder 21, of which the inputs are connected to the outputs of the multiplicators 20 and of which the output forms the output 18 of the circuit.

Each comparator 19 is designed to give the value 1 on the output if a corresponding picture element coincides with an external condition, for example delivered from the before mentioned computer.

To the other input of the respective multiplicators, constant values 1, 2, 3 .... 8 are used corresponding to the position of the respective photo diode picture point and the respective outputs of the multiplicators then determines the position of the picture point when said criterion is fulfilled and is numerically zero otherwise. The adder 21 is designed to sum up all the values coming from the multiplicator 20 and its output signal, which is a single resulting numerical value is a measurement of the number of and/or the sum of the positions for the picture elements which fulfils said criterion. The first case is achieved when the multiplicators are bypassed so that the output signals of the comparators 19 directly reach the adder 21.

It is obvious that the invention cannot be considered to be limited to the embodiment shown on the drawing and described above, but within the scope of the invention it can be varied in many ways. This concerns particularly the design of the digital circuit 17 and the GLU 6, which by means of Boolean algebra can be transformed with an unchanged function so that other gate combinations than those shown, are achieved.

We claim:

1. Device for an array (1) of photo diodes, arranged in a matrix, which are integrated onto the same semiconductor substrate (4) as a picture processor (3) connected to the photo diodes, where the picture processor (3) is of a type allowing parallel signal processing, such as picture transformation of the picture signals coming from the photo diodes, said device further including a digital circuit (17) arranged on said substrate (4) and connected to the processor (3) characterized in that said digital circuit (17) is arranged to determine the number and/or the position and/or the sum of the positions of selected picture elements from the processed picture, said elements having been found, by means of the picture processor, to fulfill a predetermined condition, whereby a reduction of picture data flow from said substrate is achieved.

2. A device for an array (1) of photo diodes, arranged in a matrix, which are integrated onto the same semiconductor substrate (4) as a picture processor (3) connected to the photo diodes, where the picture processor (3) is of a type allowing parallel signal processing, such as picture transformation of the picture signals coming from the photo diodes, said device further including a digital circuit (17) arranged on said substrate (4) and connected to the processor (3), characterized in that said digital circuit circuit (17) includes the same number of comparators (19) as there are photo diodes and where the comparators (19) are connected to the picture processor and arranged to generate the numerical digit "one" at the output for each picture element that corresponds to an external criterion, the number of multiplicators (20) is equal to the number of comparators (19) and the multiplicators (20) are connected to a respective comparator output and arranged to generate an output indicating the position of the picture point when said criterion is fulfilled and output "zero" otherwise and a digital adder (21), where the inputs are connected to the outputs of the multiplicators (20) and where the output is a measurement of the number and/or the position of the picture elements and/or the sum of the positions of the picture elements which fullfil said criterion.

3. A device for an array (1) of photo diodes, arranged in a matrix, which are integrated onto the same semiconductor substrate (4) as a picture processor (3) connected to the photo diodes, where the picture processor (3) is of a type allowing parallel signal processing, such as picture transformation of the picture signal coming from the photo diodes, said device further including a digital circuit (17) arranged to select an object chosen in advance, characterized in that the device comprises a plurality of circuit blocks (11), one for each photo diode, each circuit block (11) having two inputs one of which is for deciding if a corresponding picture point is background or part of an object and the other is for marking the corresponding picture point as representative of the chosen object, whereby said circuit block is arranged to output a binary signal corresponding to the object if the corresponding picture point is representative of the chosen object or is an object point bordering a picture point, which by its circuit block has been pointed out to belong to the chosen object.

* * * * *